United States Patent
Oh et al.

(10) Patent No.: US 7,260,399 B1
(45) Date of Patent: Aug. 21, 2007

(54) METHOD AND SYSTEM FOR ASYMMETRIC HANDOFF OF WIRELESS COMMUNICATION SESSIONS

(75) Inventors: Dae-Sik Oh, Overland Park, KS (US); Deuk-Ho Ryu, Olathe, KS (US); Leo Anderson, Raymoore, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 159 days.

(21) Appl. No.: 10/930,621

(22) Filed: Aug. 30, 2004

(51) Int. Cl.
*H04Q 7/20* (2006.01)

(52) U.S. Cl. .................. 455/436; 455/435.1; 455/437; 455/438; 455/439; 455/440; 455/442; 455/443; 455/456.1; 455/452.2; 455/550.1; 455/552.1; 455/553.1; 370/331; 370/333; 370/338

(58) Field of Classification Search .............. 455/41.2, 455/41.3, 435.1, 435.2, 436–444, 456.1–457, 455/452.2, 550.1, 552.1, 553.1; 370/238, 370/331, 333, 338
See application file for complete search history.

(56) References Cited

U.S. PATENT DOCUMENTS

| | | | |
|---|---|---|---|
| 5,673,308 A | 9/1997 | Akhavan | 379/61 |
| 5,737,703 A | 4/1998 | Byrne | 455/442 |
| RE35,916 E | 10/1998 | Dennison et al. | 455/456 |
| 5,946,616 A | 8/1999 | Schornack | 455/422 |
| 5,953,657 A | 9/1999 | Ghisler | 455/417 |
| 6,026,301 A * | 2/2000 | Satarasinghe | 455/436 |
| 6,061,337 A * | 5/2000 | Light et al. | 370/331 |
| 6,075,989 A | 6/2000 | Moore et al. | 455/436 |
| 6,243,581 B1 * | 6/2001 | Jawanda | 455/432.2 |
| 6,246,673 B1 * | 6/2001 | Tiedemann, Jr. et al. | 370/333 |
| 6,321,090 B1 | 11/2001 | Soliman | 455/440 |
| 6,438,117 B1 | 8/2002 | Grilli et al. | 370/331 |
| 6,456,606 B1 | 9/2002 | Terasawa | 370/331 |
| 6,512,817 B1 | 1/2003 | Dale et al. | 379/9.05 |
| 6,584,316 B1 * | 6/2003 | Akhteruzzaman et al. | 455/445 |
| 6,587,683 B1 | 7/2003 | Chow et al. | 455/417 |
| 6,680,923 B1 * | 1/2004 | Leon | 370/328 |
| 6,990,088 B2 * | 1/2006 | Madour | 370/331 |
| 2001/0036830 A1 | 11/2001 | Wu et al. | 455/436 |
| 2003/0091021 A1 | 5/2003 | Trossen et al. | 370/349 |
| 2003/0134648 A1 * | 7/2003 | Reed et al. | 455/456 |
| 2004/0023669 A1 * | 2/2004 | Reddy | 455/456.1 |
| 2004/0090937 A1 * | 5/2004 | Chaskar et al. | 370/331 |
| 2004/0097234 A1 * | 5/2004 | Rajkotia et al. | 455/442 |
| 2004/0121778 A1 * | 6/2004 | Hunkeler et al. | 455/452.2 |
| 2004/0218575 A1 * | 11/2004 | Ibe et al. | 370/338 |

FOREIGN PATENT DOCUMENTS

WO WO0205378 7/2002

OTHER PUBLICATIONS

Pending U.S. Patent Application for Durga Prasad SATAPATHY, "Proactive Management of Dropped Calls in a Wireless Communication System", U.S. Appl. No. 10/101,106, filed Mar. 19, 2002.

\* cited by examiner

*Primary Examiner*—Steve M. D'Agosta

(57) ABSTRACT

A method for handing off a wireless communication session between a first radio network and a second radio network. The method includes handing off the wireless communication session from the first wireless communication to the second radio network based on a first trigger. The method also includes handing off the wireless communication session from the second wireless communication to the first radio network based on a second trigger, wherein the second trigger is different than the first trigger.

36 Claims, 9 Drawing Sheets

METHOD AND SYSTEM FOR ASYMMETRIC HANDOFF OF WIRELESS COMMUNICATION SESSIONS

BACKGROUND

I. Field of the Invention

This invention is directed to the field of wireless communications. More specifically, this invention is directed to the handoff of wireless communication sessions between radio networks.

II. Description of Related Art a. Wireless Communication Systems

In a typical wireless communication system, a mobile communication device (mobile station) will communicate with a fixed base station (e.g., access point) over an air interface using a radio network, and the base station provides connectivity with various resources, such as a transport network. When the mobile station first enters a coverage area of the base station (e.g., an area defined by a radio frequency (RF) radiation pattern of the base station) the mobile station will register (or associate) with the base station (access point) or other infrastructure of the particular radio network that includes the base station/access point. As long as the mobile station remains within the radio coverage area of the base station, the mobile station communicates with and through the base station so as to access the available resources.

Wireless communication systems take various forms. Two well known examples of such systems are cellular radio communication systems (e.g., code division multiple access (CDMA), time division multiple access (TDMA) or general packet radio service (GRPS) systems, which may be termed wireless wide area networks (WWANs)) and wireless local area networks (e.g., IEEE 802.11 (wireless Ethernet) or IEEE 802.15 (e.g., Bluetooth) networks.

In a WWAN, such as a CDMA network for instance, a carrier (service provider) will typically provide various radio access networks each serving a given geographic area. Each radio access network usually includes at least one base transceiver station (BTS) and at least one base station controller (BSC). The BTS radiates to define one or more coverage areas, such as cells or cell sectors, and the BSC then controls communications that occur in those coverage areas. In a usual arrangement, the BSC is then coupled with a mobile switching center (MSC) that provides connectivity with the public switched telephone network (PSTN) and/or a network access server (e.g., a packet data serving node (PDSN)) that provides connectivity with a packet-switched network such as the Internet.

When a mobile station powers on or otherwise enters a given coverage area of the cellular radio access network, the mobile station conventionally registers with the radio access network through signaling with the MSC and/or other network infrastructure entities. The mobile station may then engage in communication through the radio access network, so as to access resources such as the PSTN and the Internet.

A wireless local area network (WLAN) such as an 802.11b system, on the other hand, includes one or more access points that sit as nodes on a local area network (LAN). Each access point radiates to define a given radio coverage area of the access point. When a mobile station powers on or enters the coverage area of a given access point, the mobile station "associates" (e.g., registers) with the access point and gains connectivity with the LAN via the access point. The mobile station may then access resources that are available on or through the LAN, such as Internet connectivity or Voice over Internet Protocol (VoIP) services, for example.

WWANs typically serve public areas. That is, for example, a mobile station served by a typical cellular radio communication system is usually able to access the WWAN system from anywhere within the geographic coverage of the system, whether the mobile station is on the road, in a park, in a building, or elsewhere. To provide this extent of coverage, the cellular carrier typically positions BTSs in centralized locations, such as alongside roads or in the middle of cities or other areas.

WLANs, on the other hand, typically serve private areas, such as the inside of a given building, for instance. To provide this sort of coverage, an individual or WLAN provider typically positions one or more wireless (radio) access points within the building, with antennas directed as much as possible within the building. In almost all WLAN setups, some coverage leaks outside of the building as well. It will be appreciated that the configurations described above are merely typical and other arrangements are possible.

b. Handoff

When a mobile station moves between wireless coverage areas, the mobile station will normally be handed off from one coverage area to another. Such a handoff may occur intrasystem, such as between WWAN (e.g., CDMA) sectors/cells or between WLAN coverage areas. Alternatively, a handoff may occur intersystem, such as between a CDMA sector and a WLAN coverage area (provided the mobile station is capable of operating in both systems), such as is described in currently pending U.S. patent application Ser. No. 10/779,261 to Jones et al., filed Feb. 14, 2004, which is also assigned to the assignee of the present application, Sprint. The entire disclosure of U.S. Ser. No. 10/779,261 is herein incorporated by reference.

In order for such an intersystem handoff to occur, however, some mechanism must be in place to trigger the handoff, i.e., to indicate when a handoff should occur. Various triggering mechanisms may be used for this purpose. By way of example, such triggering mechanisms include (i) received signal strength, (ii) round trip signal delay and (iii) geographic location, any of which could be carried out by the mobile station itself, by the wireless network infrastructure, or by a combination of the mobile station and the infrastructure.

Received signal strength refers to the strength of signals (or the energy-to-noise ratio of signals) that the mobile station receives from the radio network infrastructure in various coverage areas. Higher received signal strength in a given coverage area often indicates that the mobile station would be better served by that coverage area. Thus, it is appropriate to use received signal strength as an indication of when to hand off from one coverage area to another.

To use received signal strength as a handoff trigger, such as when the mobile station is operating in a given coverage area and begins receiving signals (e.g. pilot signals or the like) from a neighboring/overlapping coverage area, the mobile station and/or infrastructure may monitor the strengths of the signals in order to determine when to effect a handoff. When a determination is made that the signal strength in a neighboring coverage area is sufficiently higher than the signal strength in the currently serving coverage area (e.g., the radio network the mobile station is currently being served by), the mobile station may then be handed off from the currently serving coverage area to the neighboring coverage area.

Round trip signal delay refers to the amount of time that it takes for a round trip communication between the mobile station and the infrastructure of a given coverage area. A shorter round-trip-delay for communication with the infrastructure of a given coverage area often indicates that the mobile station would be better served in that coverage area. Therefore, it is appropriate to use round-trip-delay as an indication of when to hand off from one coverage area to another, such as is described in U.S. Pat. No. 6,246,673 to Tiedemann Jr. et al., issued on Jun. 12, 2001. The entire disclosure of U.S. Pat. No. 6,246,673 is herein incorporated by reference.

To use round-trip-delay as a handoff trigger, such as when the mobile station is operating in a given coverage area and begins moving into a neighboring coverage area, the mobile station and/or the wireless infrastructure may monitor a round-trip-delay time in order to determine when to effect a handoff. For instance, the mobile station could send a time-stamped query signal to a base station and measure how long it takes to receive a response from the base station. Or the base station could send a time-stamped query signal to the mobile station and measure how long it takes to receive a response from the mobile station. When a determination is made that the round-trip-delay associated with a neighboring coverage area is sufficiently less than the round-trip-delay associated with a currently serving coverage area, the mobile station may then hand off from the currently serving coverage area to the neighboring coverage area.

Geographic location refers to the physical location of the mobile station within the geographic scope of various coverage areas. By maintaining data in the radio network and/or mobile station that demarcates borders between coverage areas, geographic location may be used as a trigger to effect handoff between the coverage areas. In practice, the mobile station or wireless network infrastructure monitors the geographic location of the mobile station (such as through use of a global positioning system (GPS) receiver included in the mobile station) and compares the mobile station's current location with the known geographic scope of various coverage areas. When a determination that the mobile station has entered the geographic region of a new coverage area is made, the mobile station may then hand off to that new coverage area. Such techniques are described in U.S. Pat. No. 6,321,090 to Soliman, which is herein incorporated by reference in its entirety.

Because of the accuracy of GPS location techniques in determining the location of a mobile station, such techniques are becoming increasingly more common for use in cellular communication systems for making call management decisions, such as when to effect a handoff from one radio network to another (e.g., intrasystem or intersystem). However, the use of GPS techniques for determining when to effect a handoff for in-building systems is problematic. For example, the physical structure of the building may prevent reception of signals from GPS satellites, thus making it difficult or impossible to accurately determine the location of a mobile station when positioned in a building. In such a situation, handoffs of the mobile station (e.g., communication sessions associated with the mobile station) may not be accomplished in a timely fashion (or accomplished at all), thus resulting in a potential loss of connectivity of the mobile station with a serving radio network (e.g., a dropped call).

SUMMARY

Systems and methods for asymmetrically triggering handoff of a mobile station between a first type of radio network (such as an in-building wireless communication system (e.g., an 802.11 system)) and a second typed of radio network (such as an out-of-building wireless communication system (e.g., a CDMA system)) are provided herein. In such approaches, a first type of trigger is used for invoking handoff when the mobile station moves from the first radio network to the second radio network, and a second (different) type of trigger is used for invoking handoff when the mobile station moves from the second radio network to the first radio network. Alternatively, a method for handing off a wireless communication session between radio networks may comprise (i) handing off the wireless communication session from a first radio network of a first type to a second radio network of a second type based on a first trigger, and (ii) handing off the wireless communication session from the second radio network to one of the first radio network and a third radio network of the first type based on a second trigger that is different than the first trigger. Further, the first radio network type may be an in-building network (such as a WLAN network) and the second radio network type may be an out-of-building network (such as a CDMA, TDMA, or GPRS network).

In one embodiment, geographic location is used as a triggering mechanism when the mobile station moves from an out-of-building system to an in-building system, and a triggering mechanism other than geographic location (e.g., round-trip-delay or signal strength) is used when the mobile station moves from the in-building system to the out-of-building system.

Such approaches overcome the fact that the geographic location of a mobile station is often difficult or impossible to determine when the mobile station is within a building. However, when the mobile station is outside of a building, it is more readily possible to determine the geographic location of the mobile station using, for example, GPS signals (assuming the mobile station is equipped with a GPS receiver), though other techniques for determining a mobile station position may be employed. Further, most in-building systems will leak to some extent outside of the building, thus allowing for handoff from the out-of-building system to the in-building system when a mobile station is at or near the outside perimeter of the building.

For one such approach, the mobile station (or a base station serving the mobile station) will monitor round-trip-delay for communication between the mobile station and a serving base station (e.g., wireless access point) when the mobile station is operating within the coverage area of the in-building system in order to determine when the mobile station should hand off to an out-of-building system. When the round-trip-delay rises to a predefined threshold level, a handoff of the mobile station from the in-building radio network to the out-of building radio network will be invoked.

Conversely, when the mobile station is operating within the coverage area of the out-of-building system, the mobile station (or a base station serving the mobile station) will monitor the geographic location of the mobile station (e.g., using GPS). When the geographic location of the mobile station moves to a point that is known to fall within the coverage of the in-building system (e.g., within a predetermined handoff area at or near the outside perimeter of the building), a handoff of the mobile station from the out-of-building radio network to the in-building radio network will be invoked.

Thus, for such an embodiment, when a mobile station moves from inside a building to outside the building, round-trip-delay will be used to trigger a handoff of the mobile station from an in-building radio network to an out-of-building radio network. Also, when the mobile station is moving from outside the building to inside the building, geographic location will be used to trigger a handoff of the mobile station from the out-of-building radio network to the in-building radio network. It is noted that such handoffs may be a handoff of a voice call or a data call (including VoIP calls). In the case of data calls, MobileIP techniques may be used to facilitate the handoff from one system to another. MobileIP is described in the Internet Engineering Task Force RFC2002, which is incorporated herein by reference in its entirety. Such an approach may include the mobile station sending a conventional mobile-IP re-registration message to its home agent after a handoff in order to notify the home agent that the mobile station has a new foreign agent (e.g., a foreign agent on the radio network the mobile station has been handed off to).

These and other aspects will become apparent to those of ordinary skill in the art by reading the following detailed description, with reference, where appropriate, to the accompanying drawings. Further, it should be understood that the embodiments noted in this summary are not intended to limit the scope of the invention as claimed.

BRIEF DESCRIPTION OF THE DRAWINGS

Exemplary embodiments of the present invention are described herein with reference to the drawings, in which.

DETAILED DESCRIPTION

While embodiments of wireless communication systems and embodiments of components of such systems are generally discussed herein with respect to certain types of wireless communication networks, it will be appreciated that the invention is not limited in these respects and that embodiments of the invention may be implemented in any number of wireless communication systems. Further, as in most telecommunications applications, it will also be appreciated that many of the elements of the various embodiments described herein are functional entities that may be implemented as hardware, firmware and/or software, and as discrete components or in conjunction with other components, in any suitable combination and location.

1. Intersystem Handoff Overview

Figure 1:
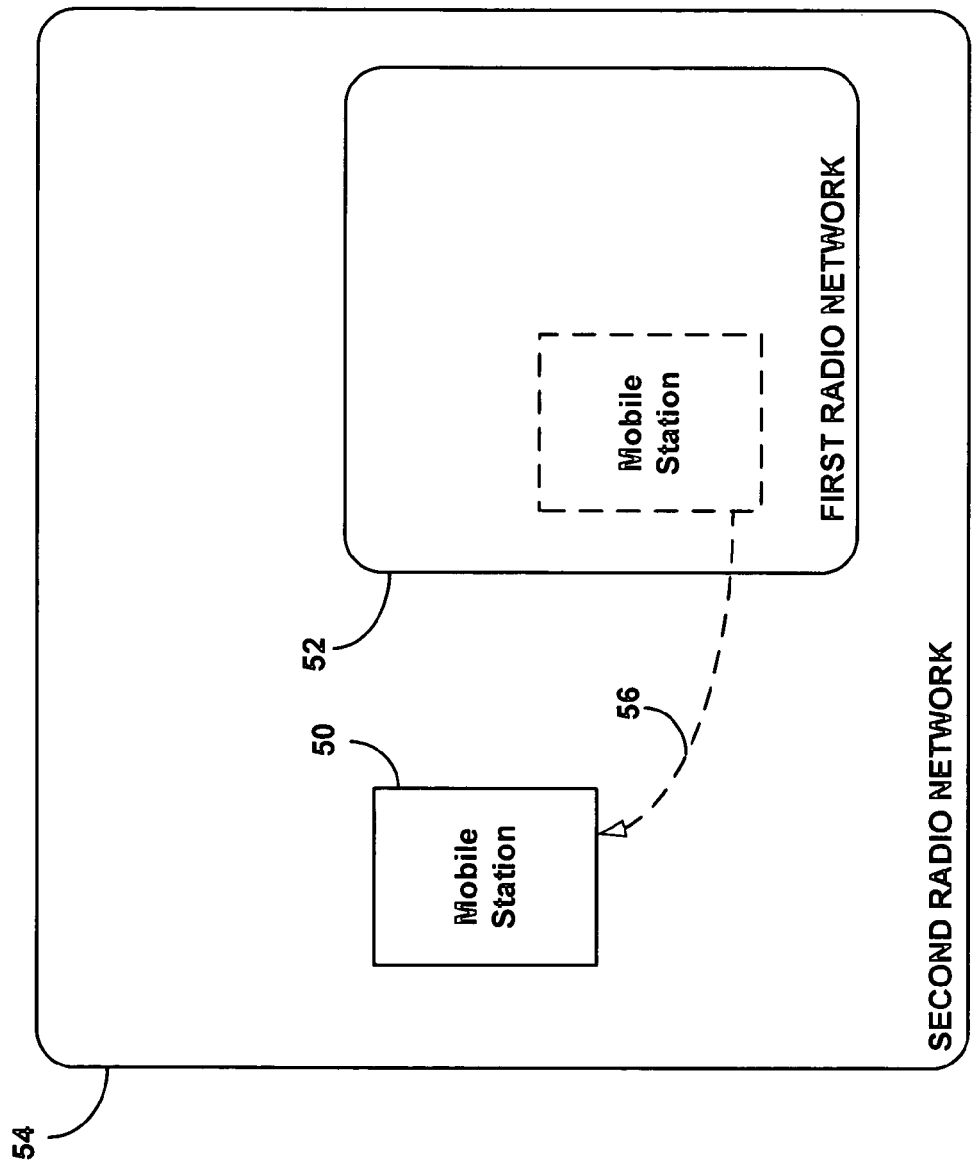
FIG. 1 is a block diagram illustrating a mobile station that is capable of communicating with first and second types of radio networks.

FIG. 1 is a block diagram illustrating a mobile communication device (or mobile station) 50 that is capable of communicating with a first radio network 52 and a second radio network 54. The mobile station 50 may communicate with other devices connected (via radio or wired interfaces) with the first or second radio networks 52, 54 in order to exchange voice, data or other types of information. The first and second radio networks 52, 54 may optionally provide connectivity to other networks, thus also allowing the mobile station 50 to communicate with devices on those other networks. The first and second radio networks 52, 54 may be any types of radio networks. For example, the first radio network 52 may be a wireless local area network (WLAN), such as an in-building packet data network. The second radio network 54 may be, for example, a wireless wide area network (WWAN), such as a cellular communication network. It will be appreciated, however, that any other type of wireless network may be used for the first and second wireless networks 52, 54.

The first radio network 52 may include one or more access points located throughout the coverage area of the first radio network 52, as will be discussed further below. As shown in FIG. 1, the coverage area of the first radio network 52 is completely within the coverage area of the second radio network 54. However, when the mobile station 50 moves (such as along a path 56) into the coverage area the first radio network 52, a mobile communication session associated with the mobile device may be handed off from the second radio network 54 to the first radio network 52 for any number of reasons.

For example, in the situation where the first radio network 52 is a WLAN and the second radio network 54 is a WWAN, connection costs may be lower for connection with the WLAN and, therefore, it would be desirable for the mobile station 50 to be served by the first radio network 52 when within its coverage area. Further, in the situation where the first radio network 52 is an in-building network and the second radio network 54 is an out of building network, coverage of the second radio network 54 within the building may be unreliable due to interference from the building's structure with the wireless signals of the second radio network 54, thus making it desirable to handoff communication with the mobile station 50 from the second radio network 54 to the first radio network 52 when the mobile station moves into the coverage area of the first radio network 52.

As will be discussed in more detail below with respect to FIGS. 5-9, a first trigger will be used to invoke a handoff of a wireless communication session from the first radio network 52 to the second radio network 54. However, a second trigger will be used to invoke a handoff of the wireless communication session from the second radio network 54 to the first radio network 52, where the second trigger is different than the first trigger. Such an approach allows for the inefficiency or inability of a single trigger to be used in both the first radio network 52 and the second radio network 54 for invoking handoffs, as previously described.

2. WLAN Architecture

Figure 2:
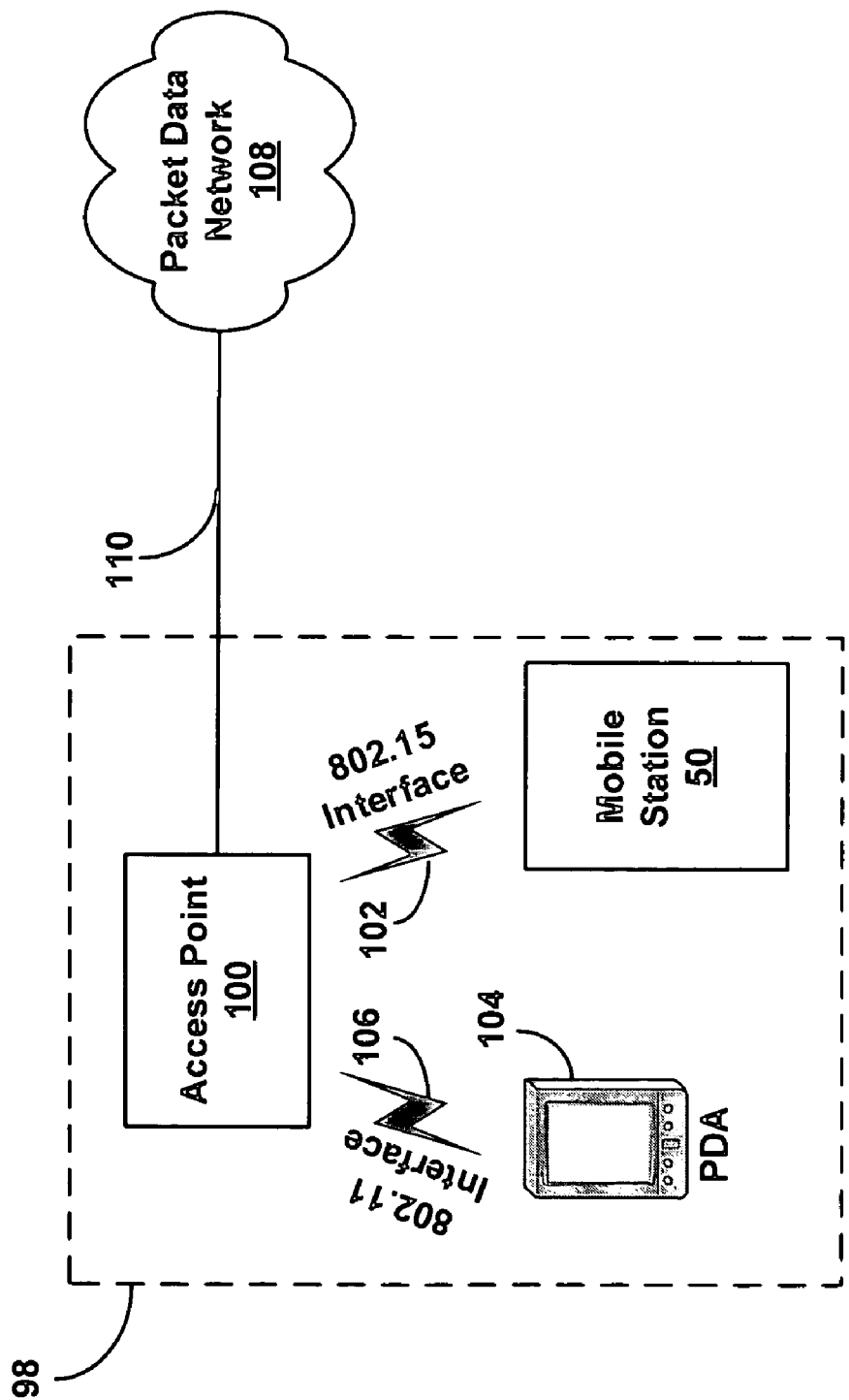
FIG. 2 is an block diagram illustrating a WLAN that may be implemented as the first radio network of FIG. 1.

FIG. 2 is block diagram illustrating a WLAN 98 that may be employed as the first radio network 52 of FIG. 1. The devices (the mobile station 50 and a wireless personal digital assistant 104) connected with the WLAN 98 (via radio interfaces 102 and 106) may communicate using one or more of the various IEEE 802.11 (wireless Ethernet) standards or IEEE 802.15 standards (or Bluetooth). IEEE 802.11 and IEEE 802.15 specify various signaling and formatting protocols that may be used by devices on the WLAN 98. For example, IEEE 802.11 provides protocols for a physical ("PHY") layer, which is used to transmit bits of information over a wireless interface. IEEE 802.11 also defines a media access control ("MAC") sub-layer, which may be used to format the bits sent over the wireless interfaces using one of the PHY layer protocols. IEEE 802.15 IEEE provides protocols for implementing a high-speed wireless serial interface that is analogous with the wired universal serial bus (USB) standards. IEEE 802.15 protocols are commonly referred to as Bluetooth protocols.

The WLAN 98 in FIG. 2 is depicted in a basic service set ("BSS") configuration. In the BSS configuration, one or more wireless nodes connect with an access point ("AP") 100. As depicted in FIG. 2, the WLAN 98 includes two wireless nodes. Specifically, the mobile station 50 serves as one wireless node and communicates with the AP 100 over an 802.15 wireless interface 102. The mobile station 50 and other wireless nodes may be any number of different devices, such as mobile phones, two-way pagers, two-way radios, personal digital assistants, Internet appliances, wirelessly-equipped computers or any other wireless device.

As depicted in FIG. 2, a personal digital assistant (PDA) 104 serves as a second wireless node and communicates with the AP 100 over an 802.11 wireless interface 106. As previously noted, other types of devices may also serve as wireless nodes. Although FIG. 2 only depicts two wireless nodes the mobile station 50, and the PDA 104, the WLAN 98 may include (interface with) a greater or fewer number of wireless nodes.

In the BSS configuration, the wireless nodes 50, 104 exchange data with each other through the AP 100. For example, the PDA 104 may send messages to the mobile station 50, and those messages are routed through the AP 100 to the mobile station 50. Similarly, the mobile station 50 may send messages to the PDA 104, and those messages are also routed through the AP 100 and then to the PDA 104. Other devices communicating in the WLAN 98 via the AP 100 may exchange messages in a similar manner.

In addition to the BSS configuration, multiple APs may be linked together to form an extended services set ("ESS"). Thus, an ESS may include two or more BSSs. In such a configuration, the APs may be linked in a variety of different manners, such as through a wired or wireless (e.g., 802.11) Ethernet connection, for example. Once linked together, the wireless nodes communicating with one AP may exchange data with the wireless nodes connected to a different linked AP. Additionally, a wireless node may move among the different wireless access points in the ESS. Thus, an ESS configuration extends the range of the WLAN 98 past that of a BSS configuration.

The AP 100 may in turn connect to a packet data network 108 via a data link 110. The data link 110 may be a wired or wireless connection. The packet data network 108 may be any type of packet data network, such as an intranet or the Internet. The packet data network 108 may additionally provide connectivity to one or more other packet data networks. Using the connectivity between the AP 100 and the packet data network 108, the mobile station 50 may communicate with a device on the packet data network 108. The WLAN 98 depicted in FIG. 2 may use any of the various 802.11 standards or 802.15 standards. For example, it may use the 802.11a, 802.11b, 802.11g, 802.15.1 or other standards in the IEEE 802.11 IEEE 802.15 families. It should be understood, however, that IEEE 802.11 and 802.15 are only two possible protocols that may be used. The first radio network 52 may use and number of other radio network protocols. For example, the first radio network 52 may alternatively be an IEEE 802.16 network, an IEEE 802.20 network, a HomeRF network, a HiperLAN, a multichannel multipoint distribution services ("MMDS") network, a digital enhanced cordless telecommunications ("DECT") network, a WWAN, or another type of radio network.

3. WWAN Architecture

Figure 3:
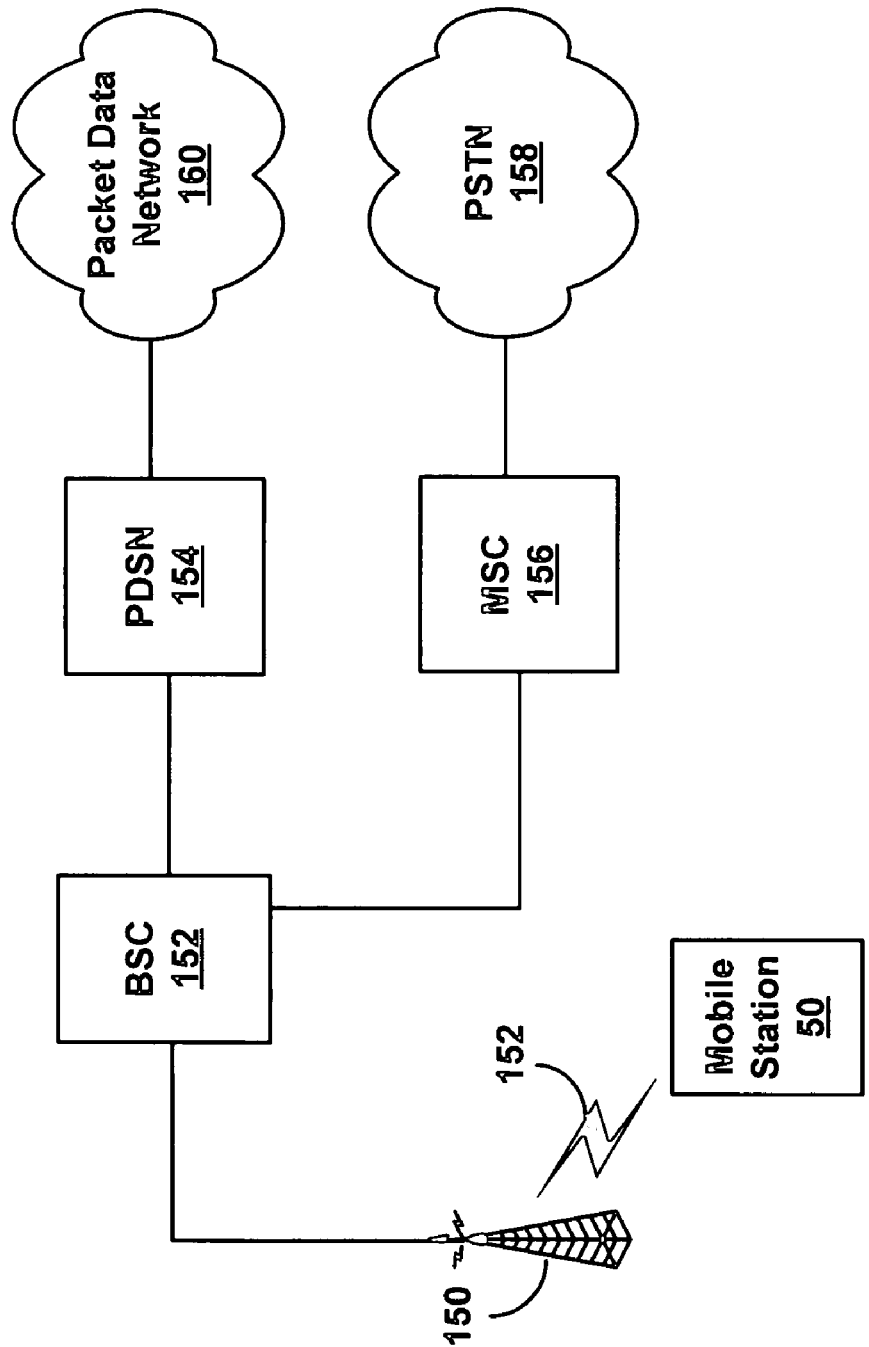
FIG. 3 shows an exemplary architecture for a WWAN that may be implemented as the second radio network of FIG. 1.

FIG. 3 is a block diagram illustrating a WWAN that may be employed as the second radio network 54 of FIG. 1. As shown in FIG. 3, the mobile station 50 communicates with a base transceiver station ("BTS") 150 via an air interface 152. The mobile station 50 may communicate with the BTS 150 using a variety of different protocols. In one exemplary embodiment, the mobile station 50 communicates with the BTS 150 via the air interface 152 using Code Division Multiple Access ("CDMA").

CDMA is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

Other wireless protocols may also be used. For example, the mobile station 50 and the base station 150 may communicate using Wideband CDMA (WCDMA), Time Division-Synchronous CDMA (TD-SCDMA), Advanced Mobile Phone Service (AMPS), Digital AMPS (D-AMPS), Universal Mobile Telecommunications System (UMTS), Global System for Mobile Communication (GSM), IS-136, Time Division Multiple Access (TDMA), IEEE 802.11, Bluetooth (e.g., 802.15.1), MMDS, DECT, integrated digital enhanced network (IDEN), general packet radio service (GRPS) or other protocols.

The BTS 150 connects to a base station controller (BSC) 152, which in turn connects to a packet-data-serving node (PDSN) 154. The PDSN 154 then connects to a packet data network 160. Using this connectivity, the mobile station 50 then is able to communicate with devices on the packet data network 160. Alternatively, the mobile station 50 might use an Internetworking Function ("IWF") in order to engage in packet data communications with another device on the WWAN or on the packet data network 160. Depending on the particular type of WWAN, other methods might also be used to provide the mobile station 50 with access to the packet data network 160.

Alternatively, the mobile station 50 may access the WWAN by placing a traditional voice call. In this situation, the BSC 152 connects to a mobile switching center (MSC) 156, which in turn may connect to the public switched telephone network (PSTN) 158. The mobile station 50 uses this connectivity to form a circuit-switched connection with another device on the PSTN. The mobile station 50 then is able to send voice traffic to the other device over this connection; however, the mobile station 50 may also send data over this type of connection. It will be appreciated that other types of circuit-switched connections may be used.

It should be understood that it is not necessary that the first radio network 52 be a WLAN but might alternatively be any other type of radio network. Also, the second radio network 54 might be a different type of WWAN than depicted in FIG. 3, or might be a wireless network other than a WWAN. Also, it is also not necessary that one particular radio network have a larger coverage area than the other radio network, and the mobile station 50 might alternatively communicate with a greater or fewer number of radio networks than are depicted in FIG. 1.

4. Mobile Communication Device (Mobile Station) Architecture

Figure 4:
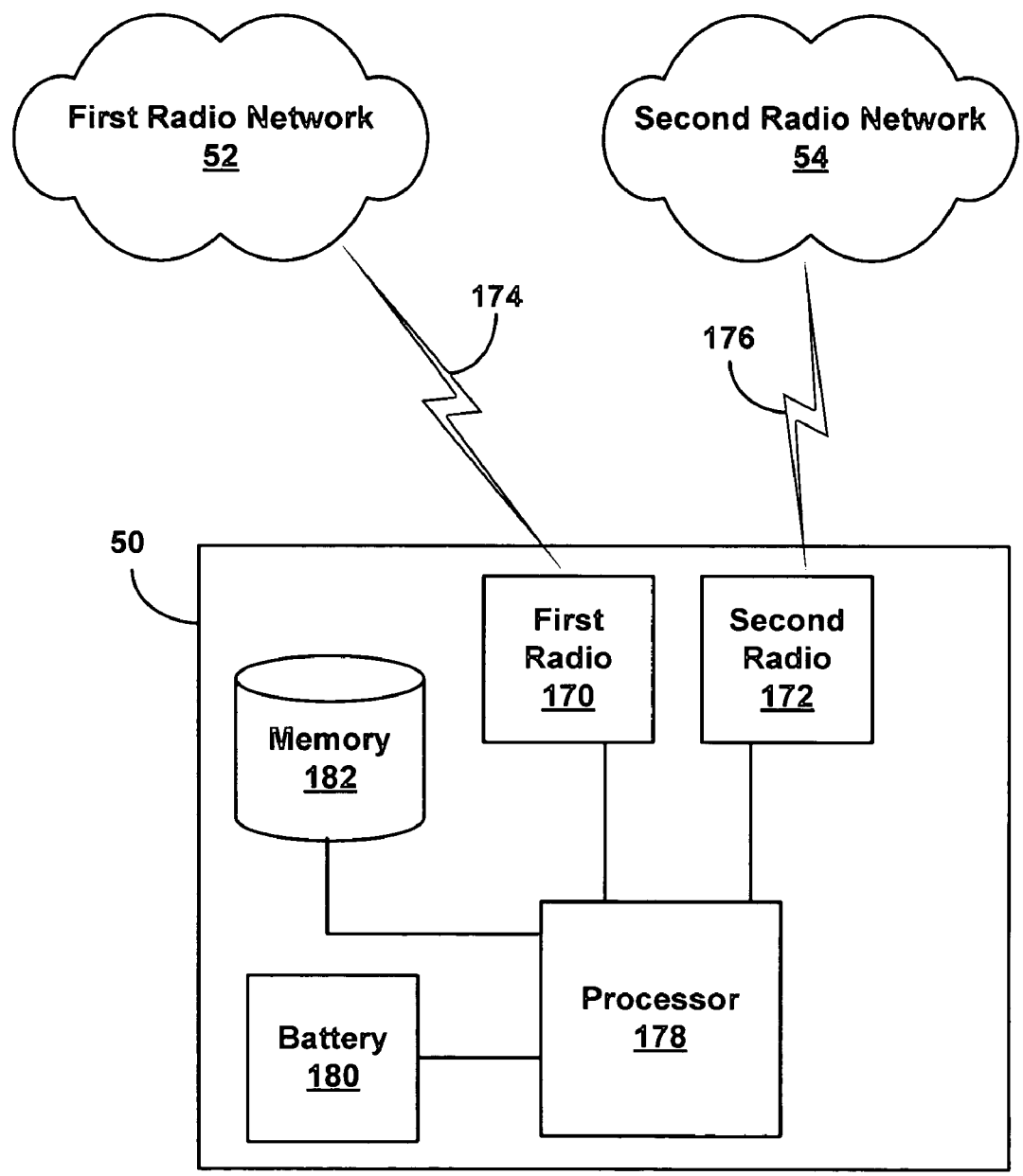
FIG. 4 is a block diagram illustrating exemplary components of the mobile station of FIG. 1 that are employed to communicate with the first and second radio networks of FIG. 1.

FIG. 4 is a block diagram illustrating the mobile station 50. The mobile station 50, as was noted above is used to communicate with the first and second radio networks 52, 54 of FIG. 1. As shown in FIG. 4, the mobile station 50 includes a first radio transceiver (short for transmitter and receiver) 170 for communicating with the first radio network 52 via a first wireless interface 174. The mobile station 50 also includes a second radio transceiver 172 for communicating with the second radio network 54 via a second wireless interface 176. The radio transceivers (hereafter "radios") 170, 172 typically vary with the types of communication protocols employed by the first and second radio networks 52, 54.

As was previously described, the first radio network 52 may be a WLAN and the second radio network 54 may be a WWAN. Thus, accordingly, in this situation, the first radio 170 would be a WLAN radio, and the second radio 172 would be a WWAN radio. Specifically, the first wireless interface 174 is an 802.15 interface 102 or the 802.11 interface 104 of FIG. 2, and the second wireless interface 176 is the air (radio) interface 152 of FIG. 3. However, the particular types of wireless interfaces 174, 176 will vary with the particular types of radio networks.

The radios 170, 172 may be separate components in the mobile station 50. For example, they may be separate application specific integrated circuits ("ASICs"), antenna systems or other separate components. Alternatively, the radios 170, 172 may be integrated into a single ASIC, such as a dual mode ASIC. The radios 170, 172 may also be integrated into a single component in the mobile station 50 other than an ASIC. Although FIG. 4 depicts two radio components 170, 172 in the mobile station 50, the mobile station 50 may include a greater or fewer number of radio components with multiple radios being integrated onto a single component in some embodiments. Thus, the mobile station 50 may communicate with a greater or fewer number of radio networks than those shown in FIG. 1.

Assuming the mobile station 50 is employed with the WLAN illustrated in FIG. 2, the first radio 170 is a WLAN radio module capable of communicating using an 802.15 protocol (or and 802.11 protocol). In this situation, the mobile station 50 uses the WLAN radio module 170 to access (communicate with) the WLAN of FIG. 2. Further assuming that the mobile station 50 is employed with the WWAN illustrated in FIG. 3, the second radio 172 is a WWAN radio module capable of communicating using, for example, CDMA, or any other WWAN protocol. Once connected to the second radio network 54 (the WWAN), the mobile station 50 uses the WWAN radio module to communicate with the WWAN of FIG. 3. It is noted that other types of radio modules may be employed in the mobile station 50 in addition to, or in replacement of the radio modules 170, 172, as described herein.

As is also illustrated in FIG. 4, a processor 178 is operationally coupled with the first radio 170 and the second radio 172 and controls their operation. Further, the processor 178 may additionally control the operation of other components in the mobile station 50. The processor 178 is also coupled with a battery 180, which supplies power to the processor 178 and other components in the mobile station 50. The processor 178 is further operationally coupled with a memory 182, which stores executable programs (e.g., service logic), data or other information (such as data used by the processor 178). For example, the memory 182 is used to store service logic that, when executed alone or in cooperation with service logic implemented in the first and second radio networks, facilitates the handoff of wireless communication sessions between the first and second radio networks 52, 54 of FIG. 1. It will be appreciated that such service logic may take the form or software, firmware, hardware, or any other suitable mechanism for implementing such executable service logic.

5. Handoff Area for Intersystem Handoff

Figure 5:
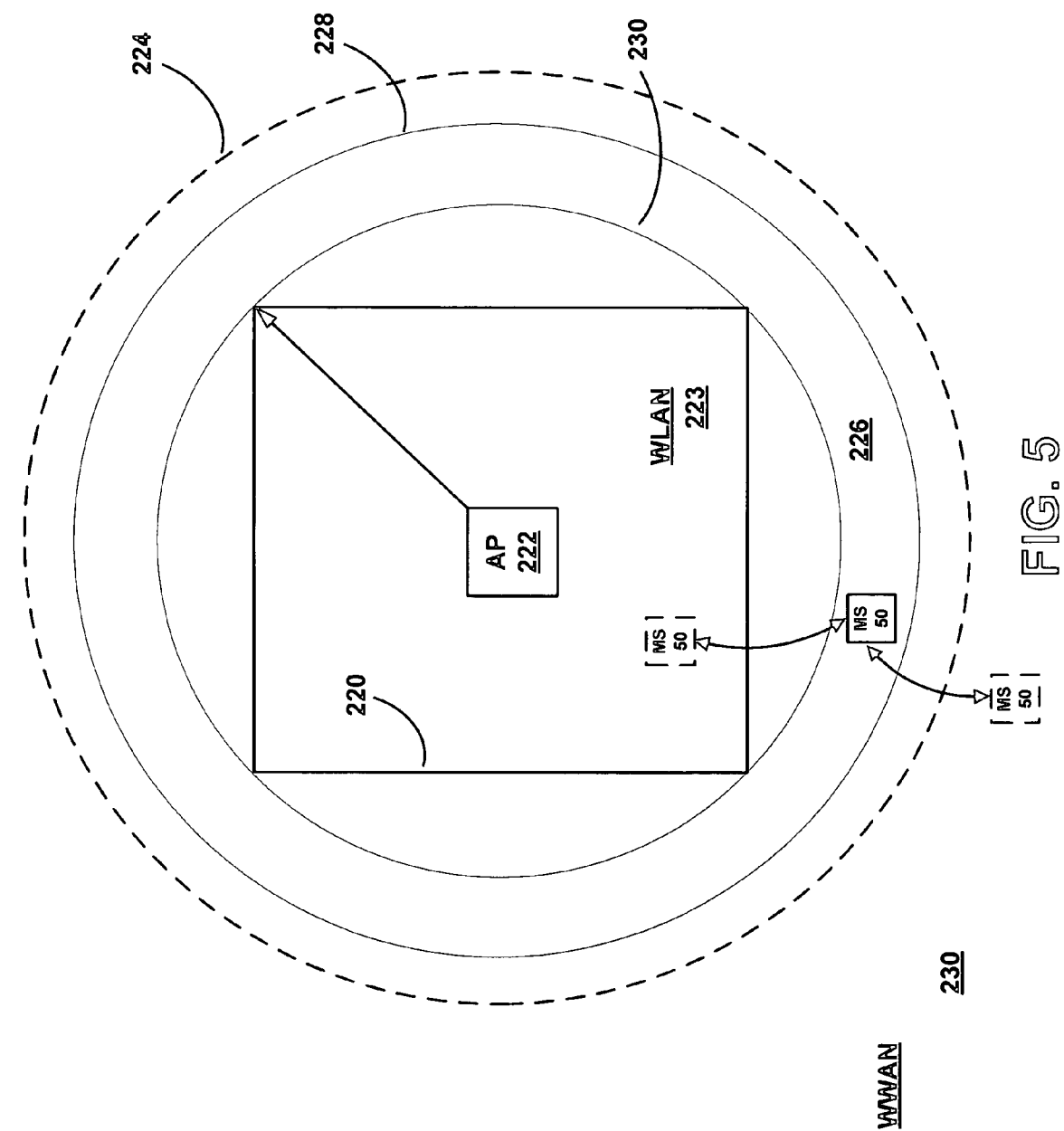
FIG. 5 is a diagram illustrating a handoff area for handoffs between a WLAN and a WWAN.

FIG. 5 is a diagram illustrating a handoff area (or region) 226 that is defined by implementing a first trigger for handoffs from a WLAN 223 to a WWAN 230. The handoff area is further defined by implementing a second trigger for handoffs from the WWAN 230 to the WLAN 223, where the second trigger is different than the first trigger.

In the arrangement shown in FIG. 5, the WLAN 223 is implemented in a building 220 and includes a wireless AP 222. The WLAN 223 may, of course, include additional APs depending on the building and the particular network. As was previously discussed, it is typical that the WLAN 223 coverage extends ("leaks") outside the building 220. For this particular example, the WLAN 223 coverage extends at least to the boundary 224 shown in FIG. 5.

The handoff area 226 is defined by a first boundary 228 and a second boundary 230. The first boundary 228 corresponds with a predetermined distance from the AP 222 that handoffs from the WLAN 223 to the WWAN 230 will be invoked. Likewise, the second boundary 230 corresponds with a predetermined distance from the AP 222 that handoffs from the WWAN 230 to the WLAN 223 will be invoked.

For the boundary 228, in an embodiment where round-trip-delay is used as a trigger for such handoffs, the threshold round-trip-delay will be selected to reflect when the mobile station 50 has moved outside of the building 220. One way to set this threshold is to measure the longest distance 225 from the AP 222 to an outside wall of the building. In the situation where the AP 222 is not centered in the building, the boundary 228 may be determined by measuring the distance from the access point to the most distant outside wall of the building and dividing that distance by the speed of light. An alternative way to set the threshold, however, is to empirically measure the round-trip-delay at a desired handoff trigger point. For instance, test equipment for measuring RTD may be placed just outside the building's doors and used to measure RTD for communication with the WLAN access point. The empirically measured RTD is then used as the handoff trigger threshold.

For the boundary 230, in an embodiment where geographic position of the mobile station 50 is used as a trigger for handoffs from the WWAN 230 to the WLAN 223, a determination that the mobile station 50 has moved to a location within the boundary 228 will result in a handoff from WWAN 230 to WLAN 223 being invoked. In such an arrangement, a plurality of geographic positions that define the boundary 230 is maintained in an entity in the WWAN 230 or in the mobile station 50, for example. Such a technique is discussed in further detail below with respect to FIG. 9.

6. Method for Intersystem Handoff

Figure 6:
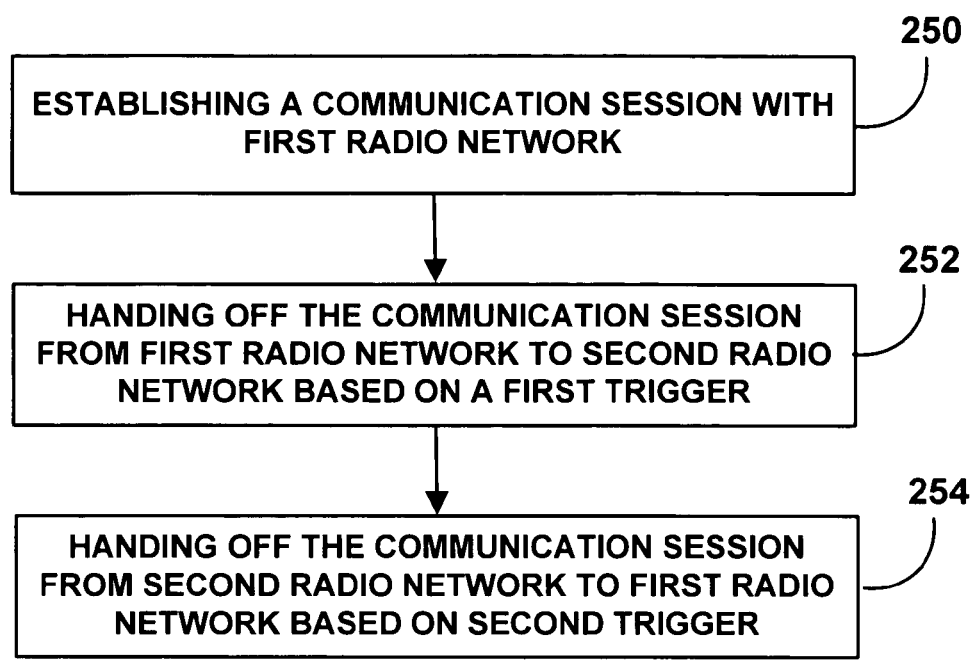
FIG. 6 is a flowchart illustrating a method for asymmetrically handing off a wireless communication session.

FIG. 6 is a flowchart illustrating a method for handing off a wireless communication session between a first radio network and a second radio network. This method will be described with further reference to FIG. 1. The method includes, at block 250, establishing a wireless communication session with the first radio network 52. Alternatively, a wireless communication session could be established with the second radio network 54. In this context, the wireless communication session may be a voice call, a packet data communication session or may simply be a registration or association of the mobile station with a base station (or AP) of the particular radio network.

The method also includes, at block 252, handing off the communication session from the first radio network (e.g., the radio network 52) to the second radio network (e.g., the radio network 54) based on a first trigger. For handoffs from the radio network 52 to the radio network 54, the first trigger may be a round-trip-delay trigger or a received signal strength trigger. It will be appreciated, however, that other types of handoff triggers may be employed and also that the first network may be a WWAN (or other radio network) as opposed to a WLAN.

The method of FIG. 6 additionally includes, at block 254, handing off the communication session from second radio network (e.g., the radio network 54) to the first radio network (e.g., the radio network 52) based on a second trigger, where the second trigger is different than the first trigger. For handoffs from the radio network 54 to the radio network 52, the second trigger may be a mobile station 50 geographic position trigger. It will be appreciated, however, that other types of handoff triggers may be employed and also that the second network may be a WLAN or other radio network) as opposed to a WWAN.

7. Handoff from WLAN to WWAN Using Round-Trip-Delay

Figure 7:
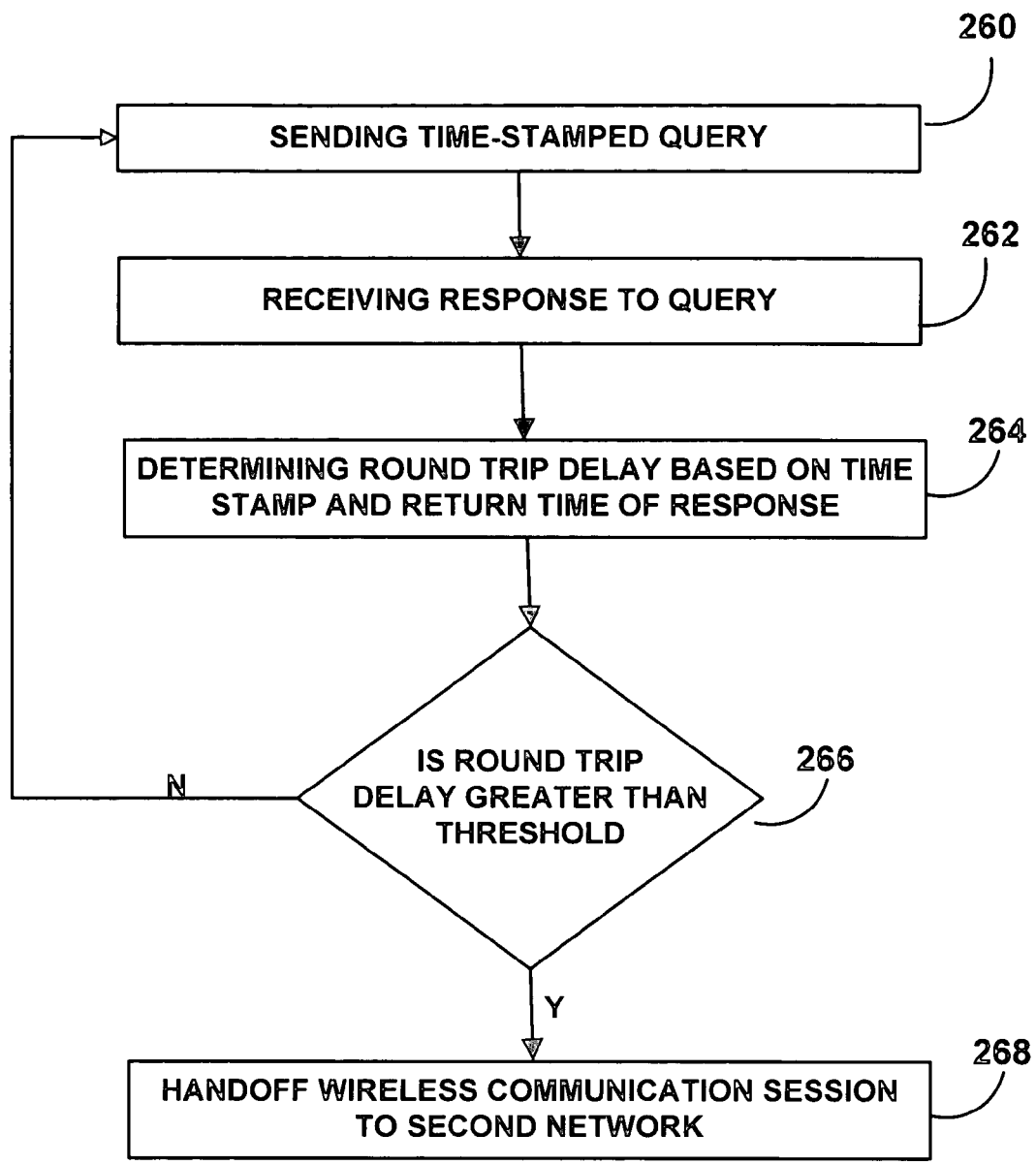
FIG. 7 is a flowchart illustrating a method for handing off a wireless communication session from an in-building network to an out-of-building network using a round-trip-delay trigger.

FIG. 7 is a flowchart illustrating a method of invoking a handoff from a WLAN to a WWAN by employing round-trip-delay as a handoff trigger. As was previously described, a threshold value for round-trip-delay may be calculated based on distance measurements from an AP in the WLAN or by empirically measuring the round-trip-delay at a desired handoff point. The method of FIG. 7 assumes an appropriate round-trip-delay threshold value has been determined.

The method of FIG. 7 includes, at block 260, sending a time-stamped query. For the WLAN 98 illustrated in FIG. 2, the query is sent from the mobile station 50 to the AP 100. Alternatively, the AP 100 may send the query to the mobile station 50. At block 262, a response to the query is received. If the mobile station 50 sends the query then the mobile station 50 will receive the response from the AP 100. Conversely, if the AP 100 sends the query, the AP 100 will receive the response from the mobile station 50. The round-trip-delay is determined at block 264 based on the time-stamp of the query and a receipt time of the response. At block 266, the round-trip-delay is compared to the predetermined threshold value, as was discussed above. If the determined round-trip-delay is less than the predetermined threshold value, the method returns to block 260. If the determined round-trip-delay is greater than the threshold, the method proceeds to block 268 and the wireless communication session is handed off a second network (e.g., a WWAN, such as the WWAN 230 in FIG. 5).

8. Handoff from WLAN to WWAN Using Received Signal Strength

Figure 8:
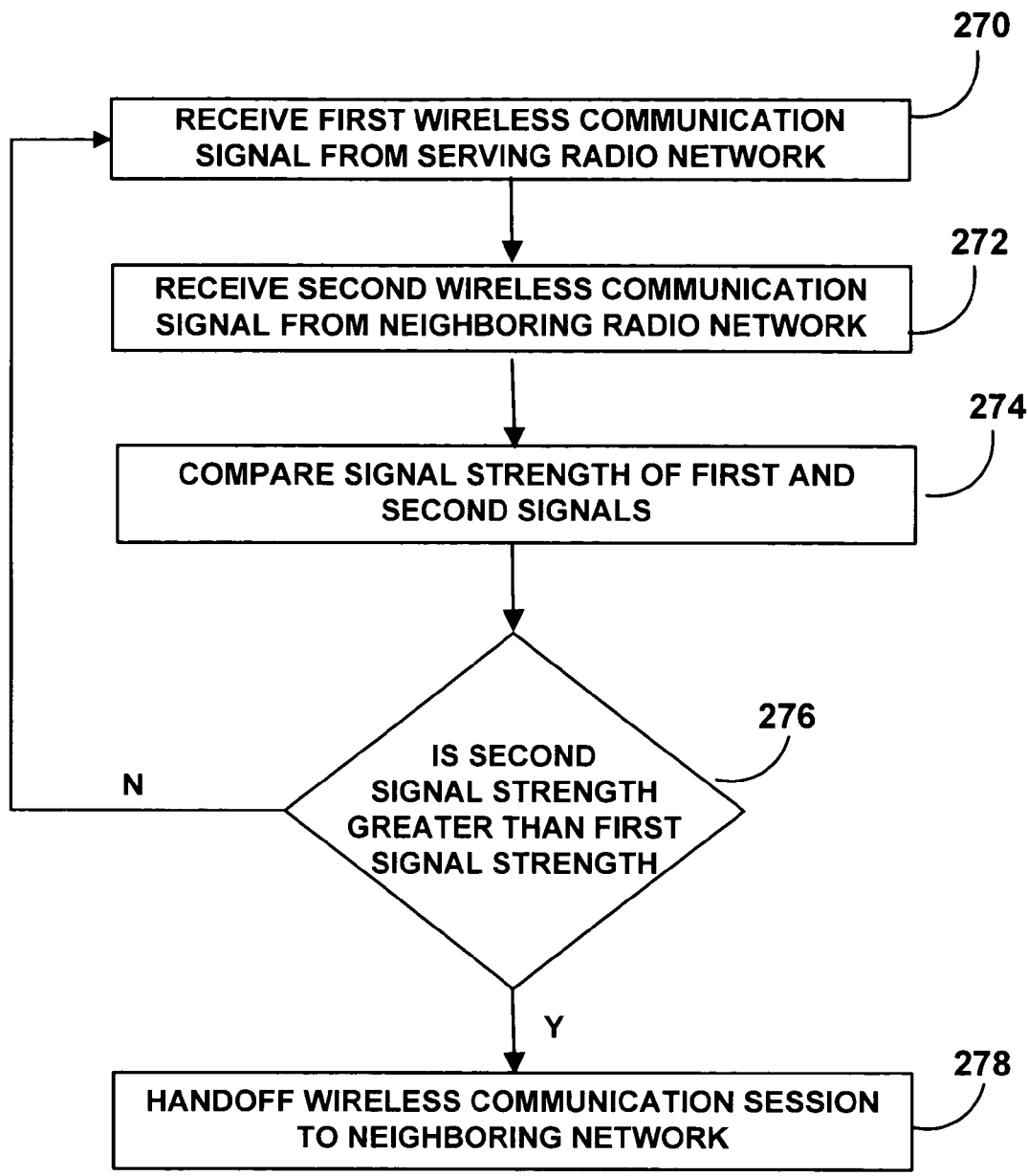
FIG. 8 is a flowchart illustrating a method for handing off a wireless communication session from an in-building network to an out-of-building network using a received signal strength trigger.

FIG. 8 is a flowchart illustrating a method of invoking a handoff from a WLAN to a WWAN by employing received signal strength as a handoff trigger. Received signal strength in a wireless communication system may be determined, for example, based on the spectral density of a received signal as a ratio of the estimated noise over the air interface, for example. However, signal strength may be determined in any number of fashions. As one alternative for the method of FIG. 8, it may be possible to ignore the noise in the air interface because the received signal strengths of signals from the first radio network and the second radio network are being compared and an assumption that noise in the air interface will be approximately equal may be made. In such a situation, it may further be assumed that the noise in each signal cancels in the comparison.

The method of FIG. 8 includes, at block 270, receiving a first wireless communication signal from a radio network that is currently servicing a mobile station. At block 272, a second wireless signal is received from a neighboring radio network. The first and second signals are compared at block 274 and a determination is made whether the first or second signal strength is greater at block 276. For the situation where the serving network is a WLAN and the neighboring network is a WWAN (or vice versa) some adjustment factor may be applied when comparing the signal strengths at block 274 due to the differences in communication protocols used in such systems.

If the strength of the second signal (from the neighboring network), based on the comparison, is greater than the strength of the first signal (from the serving network) the method proceeds to the block 278 and the wireless communication session is handed off to the neighboring network, which then becomes the serving network. If the strength of the second signal (from the neighboring network) is less than the strength of the first signal (from the serving network) the method returns to block 270 and additional signals are received and compared.

9. Handoff from WWAN to WLAN Using Geographic Position

Figure 9:
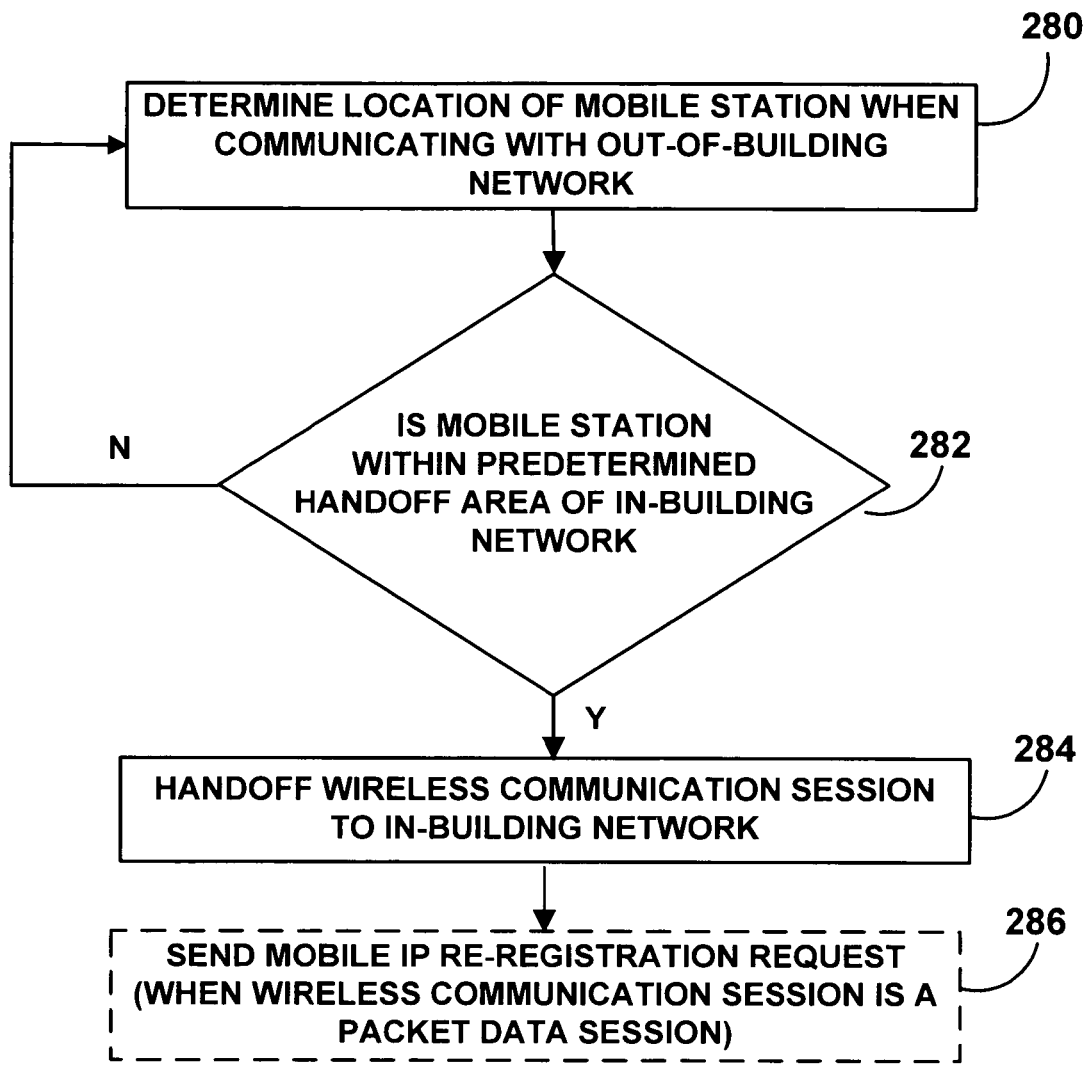
FIG. 9 is a flowchart illustrating a method for handing off a wireless communication session from an out-of-building network to an in-building network using a geographic location trigger.

FIG. 9 is a flowchart illustrating a method for handing off a wireless communication session from an out-of-building network to an in building network using geographic position. Using such an approach, in conjunction with any of the techniques described above, implements asymmetric intersystem handoff which may reduce the inefficiencies and reliability problems of employing a single handoff trigger mechanism for both directions of intersystem handoffs.

The method of FIG. 9 includes, at block 280, determining the location of a mobile station when the mobile station is communicating with an out-of-building (e.g., cellular communication) network. The mobile station may be engaged in an active call, an active data session or merely registered with a base station of the out-of-building radio network. At block 282, it is determined whether the mobile station is within a predetermined handoff area of an in-building network (e.g., inside the boundary 230 in FIG. 5). The geographic location of the mobile station is determined using any number of techniques, such a GPS, triangulation, among any number of other approaches.

In the event the mobile station is within the predetermined handoff area of the in-building network, a handoff from the out-of-building network to the in-building network is invoked. If the mobile station is not determined to be within the predetermined handoff area of the in-building network, the method returns to block 280 and the position of the mobile station is again determined to see if handoff is appropriate for the new position.

In the situation where the wireless communication session is a packet data session, FIG. 9 illustrates an additional operation that is employed. It will be appreciated that this operation may also be employed for handoffs from the in-building network (e.g., the WLAN) to the out-of-building network (e.g., the WWAN). Specifically the method of FIG. 9, at block 286, further includes the mobile station sending a re-registration request (e.g., using MobileIP) to inform its home agent that it has been handed off intersystem and now has a new foreign agent on the in-building network.

With Mobile IP, the mobile station would have a mobile-IP address assigned by a mobile-IP "home agent" on a home packet-data network. Each radio network supporting IP services in which the mobile station operates would then have a mobile-IP foreign agent. For instance, the foreign agent in the out-of-building coverage system might be a packet data serving node (PDSN) of a cellular wireless communication system, and the foreign agent in the in-building coverage system might be a LAN server or WLAN access point. When the mobile station hands off to a given system, the mobile station sends the re-registration message to the home agent, in order to notify the home agent that the mobile station has a new foreign agent. Packet data then continues to flow seamlessly to and from the mobile station.

CONCLUSION

Various arrangements and embodiments in accordance with the present invention have been described herein. It will be appreciated, however, that those skilled in the art will understand that changes and modifications may be made to these arrangements and embodiments without departing from the true scope and spirit of the present invention, which is defined by the following claims.

What is claimed is:

1. A method for handing off a wireless communication session between radio networks, the method comprising:

handing off the wireless communication session from a first radio network of a first type to a second radio network of a second type based on a first trigger; and handing off the wireless communication session from the second radio network to one of the first radio network and a third radio network of the first type based on a second trigger, wherein the second trigger is different than the first trigger, wherein the first trigger is selected from the group consisting of (i) threshold round-trip signal delay and (ii) threshold received signal strength, wherein the second trigger is threshold geographic location, wherein handing off the wireless communication session from the first radio network to the second radio network comprises employing a trigger that is based on one of (i) a comparison of a first signal strength for signals communicated between a mobile communication device associated with the wireless communication session and a radio interface device of the first radio network and a second signal strength for signals communicated between the mobile communication device and a radio interface device of the second radio network (ii) a round trip delay for signals communicated between the mobile communication device and the radio interface device of the first radio network, and wherein handing off the wireless communication session from the second radio network to one of the first radio network and the third radio network comprises employing a trigger that is based on a geographic position of a mobile communication device associated with the wireless communication session.

2. The method of claim 1, wherein the first radio network type is an in-building radio network and the second radio network type is an out-of-building radio network.

3. The method of claim 2, wherein the out-of-building radio network comprises one of a code division multiple access network, a time division multiple access network, and a general packet radio service network.

4. The method of claim 2, wherein the in-building radio network comprises a wireless local area network.

5. The method of claim 4, wherein the wireless local area network comprises a network in accordance with at least one of an IEEE 802.11 network protocol and an IEEE 802.15 network protocol.

6. The method of claim 1, wherein the first radio network type is an out-of-building radio network and the second radio network type is an in-building radio network.

7. The method of claim 6, wherein the out-of-building radio network comprises one of a code division multiple access network, a time division multiple access network, and a general packet radio service network.

8. The method of claim 6, wherein the in-building radio network comprises a wireless local area network.

9. The method of claim 8, wherein the wireless local area network comprises a network in accordance with at least one of an IEEE 802.11 network protocol and an IEEE 802.15 network protocol.

10. The method of claim 1, wherein handing off the wireless communication session from the first radio network to the second radio network based on the first trigger comprises:

determining a round-trip delay for communication between the mobile communication device associated with the wireless communication session and the radio interface device of the first radio network;

comparing the round-trip delay with a predetermined threshold value; and in the event the round-trip delay is determined to be greater than the predetermined threshold value, handing off the wireless communication session from the first radio network to the second radio network.

11. The method of claim 10, wherein the radio interface device of the first radio network comprises a wireless local area network access point.

12. The method of claim 10, wherein determining the round-trip-delay comprises:

sending a time-stamped query from the mobile communication device to the radio interface device of the first radio network;

receiving a response to the query from the radio interface device of the first radio network at the mobile communication device; and calculating the round-trip delay based on the time-stamp of the query and a time of receipt of the response.

13. The method of claim 10, wherein determining the round-trip-delay comprises:
sending a time-stamped query from the radio interface device of the first radio network to the mobile communication device;
receiving a response to the query from the mobile communication device at the radio interface device of the first radio network; and
calculating the round-trip delay based on the time-stamp of the query and a time of receipt of the response.

14. The method of claim 1, wherein handing off the wireless communication session from the first radio network of the first type to the second radio network of the second type based on the first trigger comprises:
determining a signal strength of a first signal received by the mobile communication device from the radio interface device of the first radio network;
determining a signal strength of a second signal received by the mobile communication device from a radio interface device of the second radio network;
comparing the strengths of the first and second signals; and
in the event the strength of the second signal is sufficiently greater than the strength of the first signal, handing off the wireless communication session from the first radio network to the second radio network.

15. The method of claim 1, wherein handing off the wireless communication session from the second radio network to one of the first radio network and the third radio network based on the second trigger comprises:
determining a geographic location of mobile communication device associated with the wireless communication session;
determining whether the determined geographic location of the mobile communication device is within a predetermined handoff area associated with one of the first radio network and the third radio network; and
in the event the mobile communication device is determined to be within the predetermined handoff area, handing off the mobile communication session from the second radio network to one of the first radio network and the third radio network.

16. The method of claim 15, wherein determining the location of the mobile communication device comprises determining the location of the mobile communication device using global positioning satellites.

17. The method of claim 15, wherein determining the location of the mobile communication device comprises determining the location of the mobile communication device using triangulation.

18. The method of claim 1, wherein the wireless communication session is a voice call.

19. The method of claim 1, wherein the wireless communication session is a packet data communication session.

20. The method of claim 19, further comprising sending a MobileIP re-registration request to a home agent of a mobile communication device associated with the wireless communication session after the wireless communication session is handed off from the first radio network to the second radio network or handed off from the second radio network to one of the first radio network and the third radio network.

21. A mobile communication device comprising:
a first radio transceiver for communicating with radio networks of a first type, wherein networks of the first type implement at least a first communication protocol;
a second radio transceiver for communicating with radio networks of a second type, wherein networks of the second type implement at least a second communication protocol that is different than the first communication protocol;
a processor controlling the first and second radio transceivers;
a storage device having executable service logic stored therein that, when executed, provides for:
in cooperation with one or more entities of radio networks of the first and second types, handing off a wireless communication session of the mobile communication device from a first radio network of the first type to a second radio network of the second type based on a first trigger, wherein handing off the wireless communication session from the first radio network to the second radio network based on the first trigger comprises (i) determining a round-trip delay for communication between the mobile communication device and a radio interface device of the first radio network, (ii) comparing the round-trip delay with a predetermined threshold value, and (iii) in the event the round-trip delay is determined to be greater than the predetermined threshold value, handing off the mobile communication session from the first radio network to the second radio network; and
in cooperation with the one or more entities of radio networks of the first and second types, handing off the wireless communication session from the second radio network to one of the first radio network and a third radio network of the first type based on a second trigger, wherein the second trigger is different than the first trigger,
wherein the first trigger is selected from the group consisting of (i) threshold round-trip signal delay and (ii) threshold received signal strength, and
wherein the second trigger is threshold geographic location.

22. The mobile communication device of claim 21, wherein the first transceiver is a transceiver in accordance with one of an IEEE 802.11 network protocol and an IEEE 802.15 network protocol.

23. The mobile communication device of claim 21, wherein the second transceiver is a transceiver in accordance with one of a code division multiple access network, a time division multiple access network and a general packet radio service network.

24. The mobile communication device of claim 21, wherein the mobile communication device comprises at least one of a wireless telephone, a wireless personal digital assistant and a wireless computer.

25. The method of claim 21, wherein handing off the wireless communication session from the second radio network to one of the first radio network and the third radio network based on the second trigger comprises:
determining a geographic location of the mobile communication device;
determining whether the geographic location of the mobile communication device is within a predetermined handoff area associated with one of the first radio network and the third radio network; and
in the event the mobile communication device is determined to be within the predetermined handoff area, handing off the mobile communication session from the second radio network to one of the first radio network and the third radio network.

26. A wireless communication system comprising:
  a first radio network that implements a first network protocol;
  a second radio network that implements a second network protocol, wherein the second network protocol is different than the first network protocol;
  a mobile communication device comprising: (i) a first radio transceiver for communicating with a first radio network, the first radio network implementing a first communication protocol; (ii) a second radio transceiver for communicating with a second radio network, the second radio network implementing a second communication protocol that is different than the first communication protocol; and (iii) a processor controlling the first and second radio transceivers; and
  service logic executable to: (i) handoff a wireless communication session from the first radio network to the second radio network based on a first trigger; and (ii) handoff the wireless communication session from the second radio network to the first radio network based on a second trigger, wherein the second trigger is different than the first trigger,
  wherein the first trigger is selected from the group consisting of (i) threshold round-trip signal delay and (ii) threshold received signal strength,
  wherein the second trigger is threshold geographic location, and
  wherein handing off the wireless communication from the first radio network to the second radio network comprises (i) sending a time-stamped query from the mobile communication device to a radio interface device of the first radio network, (ii) receiving a response to the query from the radio interface device at the mobile communication device, (iii) calculating a round-trip delay based on the time-stamp of the query and a time of receipt of the response, (iv) comparing the round-trip delay with a predetermined threshold value, and (v) in the event the round-trip delay is determined to be greater than the predetermined threshold value, handing off the wireless communication session from the first radio network to the second radio network.

27. The system of claim 26, wherein the first radio network comprises a wireless local area network (WLAN).

28. The system of claim 27, wherein the WLAN comprises a network in accordance with an IEEE 802.11 protocol.

29. The system of claim 27, wherein the WLAN comprises a network in accordance with an IEEE 802.15 protocol.

30. The system of claim 26, wherein the second radio network comprises a wireless wide area network (WWAN).

31. The system of claim 30, wherein the WWAN comprises a cellular communication network.

32. The system of claim 31, wherein the cellular communication network comprises one of a code division multiple access network, a time division multiple access network and a general packet radio service network.

33. The system of claim 26, wherein handing off the wireless communication from the second radio network to the first radio network comprises:
  determining a geographic location of the mobile communication device;
  determining whether the determined geographic location of the mobile communication device is within a predetermined handoff area associated with the first radio network; and
  in the event the mobile communication device is determined to be within the predetermined handoff area, handing off the wireless communication session from the second radio network to the first radio network.

34. A mobile communication device for connecting with a wireless wide area network, the mobile communication device comprising service logic for:
  handing off a wireless communication session associated with the mobile communication device from the wireless wide area network to a wireless local area network according a first trigger; and
  handing off the wireless communication session from the wireless local area network to the wireless wide area network according to a second trigger, wherein the second trigger is different than the first trigger,
  wherein the first trigger is threshold geographic location,
  wherein the second trigger is selected from the group consisting of (i) threshold round-trip signal delay and (ii) threshold received signal strength,
  wherein handing off the wireless communication session from the wireless wide area network to the wireless local area network according to the first trigger comprises employing a trigger that is based on a geographic position of the mobile communication device, and
  wherein handing off the wireless communication session from the wireless local area network to the wireless wide area network according to the second trigger comprises employing a trigger that is based on one of (i) a comparison of a first signal strength for signals communicated between the mobile communication device and a radio interface device of the wireless local area network and a second signal strength for signals communicated between the mobile communication device and a radio interface device of the wireless wide area network (ii) a round trip delay for signals communicated between the mobile communication device and the radio interface device of the wireless local area network.

35. The mobile communication device of claim 34, wherein the wireless wide area network is a code division multiple access network.

36. The mobile communication device of claim 34, wherein the wireless local area network comprises a network in accordance with at least one of an IEEE 802.11 network protocol and an IEEE 802.15 network protocol.

* * * * *